(No Model.)

C. ZIMMERMAN.
INSECT EXTERMINATOR.

No. 595,750.　　　　　　　Patented Dec. 21, 1897.

Witnesses:
Fenton S. Pelt,
J. A. Willson

Inventor:
Casper Zimmerman,
by H. B. Willson & Co.
Attorneys.

THE NORRIS PETERS CO., PHOTO-LITHO., WASHINGTON, D. C.

UNITED STATES PATENT OFFICE.

CASPER ZIMMERMAN, OF SANTA ROSA, CALIFORNIA.

INSECT-EXTERMINATOR.

SPECIFICATION forming part of Letters Patent No. 595,750, dated December 21, 1897.

Application filed September 1, 1897. Serial No. 650,241. (No model.)

*To all whom it may concern:*

Be it known that I, CASPER ZIMMERMAN, a citizen of the United States, residing at Santa Rosa, in the county of Sonoma and State of California, have invented certain new and useful Improvements in Automatic Insect-Exterminators; and I do declare the following to be a full, clear, and exact description of the invention, such as will enable others skilled in the art to which it appertains to make and use the same.

My invention relates to an automatic insect exterminator or trap; and the object is to provide a simple, inexpensive, and effective device for automatically exterminating flies, ants, roaches, water-bugs, and the like; and to this end the invention consists in the construction, combination, and arrangement of the several parts of the device, as will be hereinafter more fully described, and particularly pointed out in the claim.

In the accompanying drawings the same reference-characters indicate the same parts of the invention.

Figure 1:
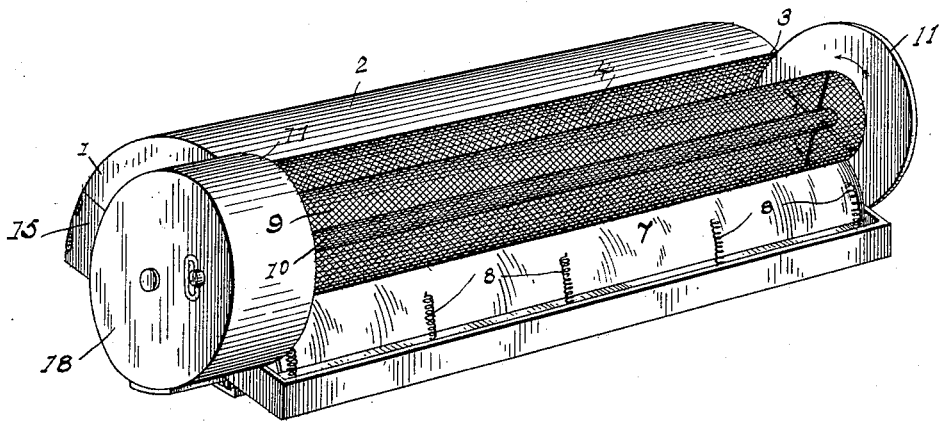
Figure 2:
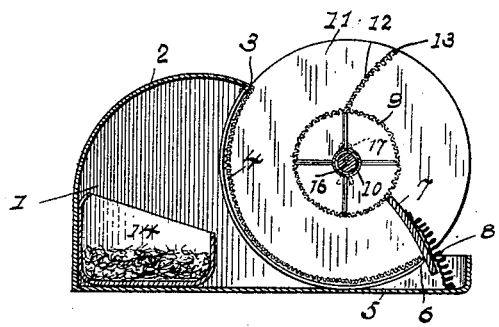

Figure 1 is a perspective view of my improved insect-exterminator. Fig. 2 is a transverse section of the same.

1 represents a longitudinal sheet-metal casing formed with a curved hood 2, from the upper edge 3 of which a segmental wire-netting 4 extends in circular form down to the base-plate 5, terminating in a longitudinal edge 6, and 7 represents a longitudinal blade mounted parallel with the edge 6 upon the upper ends of the springs 8 8, the lower ends of which are fixed to the base-plate 5, so as to permit a lateral hinged movement of said blade.

9 represents a wire-gauze cylinder mounted on the tubular sleeve 10, journaled in the parallel ends 11 11 of the casing. This cylinder 9 is mounted in said casing concentric with the segmental wire-gauze netting 4, and it is formed with a radial curved reticulated wing 12, extending the entire length of the cylinder, so that its outer edge 13 is adapted to sweep the contiguous face of the curved netting 4.

The outer edge of the hinged blade 7 rests against the face of the cylinder, and as it revolves the wing 12 presses the blade 7 out of its path, and after it has passed the springs 8 8 restore the blade to its normal position.

14 represents the longitudinal bait-trough, which extends the entire length of the casing, and it may be inserted and withdrawn through the door 15, located in the end of said casing.

16 represents the driving-shaft, extending through the tubular sleeve 10 and removably secured thereto by the split key 17. This shaft 16, and consequently the reticulated cylinder 9, is rotated in the direction of the arrow by means of a train of spring-actuated gearing located in the cylindrical casing 18, the casing, gearing, and shaft 16 being removably secured in place in the main case 1 in any suitable manner to permit the same to be removed for the purpose of cleaning the same whenever necessary.

The operation of the device is as follows: Any suitable bait being placed in the trough, the cylinder is then rotated in the direction of the arrow by means of its gearing, and the flies and other insects which are attracted to the curved netting 4 by the bait are crushed by the wing 12.

Of course it will be understood that the meshes of the wire-netting correspond to the class of insects to be destroyed, the meshes being much smaller for ants and the like than for flies and roaches, and by increasing the size of the machine and providing a spring-actuated gearing of sufficient power mice, rats, and even rabbits may be destroyed in the same manner.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

An automatic insect-exterminator comprising the casing 1, formed with the closed curved hood 2, the segmental wire-netting 4 connected to said hood, the spring-actuated shaft 16, in combination with the reticulated cylinder 9 fixed on the sleeve 10 mounted on said shaft 16 and provided with the radial curved wing 12 and the hinged blade 7 mounted in said casing parallel with said cylinder and in the path of the wing 12, substantially as described.

In testimony whereof I hereunto affix my signature in presence of two witnesses.

CASPER ZIMMERMAN.

Witnesses:
ELMER E. SHIELDS,
JNO. TYLER CAMPBELL.